(12) United States Patent
Yoshimoto et al.

(10) Patent No.: US 11,195,582 B2
(45) Date of Patent: Dec. 7, 2021

(54) NON-VOLATILE MEMORY DEVICE AND METHOD OF WRITING TO NON-VOLATILE MEMORY DEVICE

(71) Applicant: PANASONIC SEMICONDUCTOR SOLUTIONS CO., LTD., Kyoto (JP)

(72) Inventors: Yuhei Yoshimoto, Hyogo (JP); Yoshikazu Katoh, Osaka (JP); Naoto Kii, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 0 days.

(21) Appl. No.: 16/935,503

(22) Filed: Jul. 22, 2020

(65) Prior Publication Data

US 2020/0350012 A1 Nov. 5, 2020

Related U.S. Application Data

(63) Continuation of application No. PCT/JP2018/040095, filed on Oct. 29, 2018.

(30) Foreign Application Priority Data

Jan. 23, 2018 (JP) .............................. JP2018-009148

(51) Int. Cl.
*G11C 11/00* (2006.01)
*G11C 7/24* (2006.01)
*G11C 13/00* (2006.01)

(52) U.S. Cl.
CPC ........ *G11C 13/0059* (2013.01); *G11C 13/004* (2013.01); *G11C 13/0007* (2013.01); *G11C 13/0069* (2013.01); *G11C 2213/79* (2013.01)

(58) Field of Classification Search
CPC ..... G11C 13/004; G11C 13/0069; G11C 7/14; G11C 2013/0054; G11C 13/0007;
(Continued)

(56) References Cited

U.S. PATENT DOCUMENTS

2012/0072737 A1 3/2012 Schrijen et al.
2013/0033921 A1* 2/2013 Tsuda ................. G11C 13/0004
365/148

(Continued)

FOREIGN PATENT DOCUMENTS

JP 2006-025366 A 1/2006
JP 2007-067942 A 3/2007
(Continued)

OTHER PUBLICATIONS

Extended European Search Report dated Dec. 16, 2020 issued in corresponding European Patent Application No. 18902861.6.
(Continued)

*Primary Examiner* — Hien N Nguyen
(74) *Attorney, Agent, or Firm* — McDermott Will and Emery LLP

(57) ABSTRACT

A non-volatile memory device includes: a memory group of a plurality of variable resistance memory cells in which digital data is recorded according to a magnitude of a resistance value, the memory group including at least one data cell and at least one dummy cell which are associated with each other; and a read circuit which performs, in parallel, a read operation on each of the plurality of memory cells included in the memory group. Dummy data, for reducing a correlation between a side-channel leakage generated when the read operation is performed by the read circuit and information data recorded in the at least one data cell, is recorded in the at least one dummy cell.

10 Claims, 13 Drawing Sheets

(58) Field of Classification Search
CPC ............ G11C 2213/79; G11C 2213/77; G11C 13/003; G11C 11/1673; G11C 13/0026; G11C 16/349; G11C 7/062; G11C 11/15
See application file for complete search history.

(56) References Cited

U.S. PATENT DOCUMENTS

| | | | |
|---|---|---|---|
| 2013/0272078 A1 | 10/2013 | Nakanishi et al. | |
| 2015/0103598 A1 | 4/2015 | Tasher et al. | |
| 2015/0213885 A1 | 7/2015 | Katoh | |
| 2016/0148664 A1 | 5/2016 | Katoh et al. | |
| 2017/0345492 A1* | 11/2017 | Yoshimoto | G06F 3/0604 |

FOREIGN PATENT DOCUMENTS

| | | |
|---|---|---|
| JP | 2013-126078 A | 6/2013 |
| JP | 2013-239142 A | 11/2013 |
| JP | 2014-153552 A | 8/2014 |
| JP | 2016-105585 A | 6/2016 |
| WO | 2010/100015 A1 | 9/2010 |
| WO | 2014/119329 A1 | 8/2014 |

OTHER PUBLICATIONS

International Search Report and Written Opinion, dated Dec. 4, 2018 in International Application Mo. PCT/JP2018/040095; with partial English translation.

Paul Kocher, et al., "Introduction to Differential Power Analysis and Related Attacks," Cryptography Research, and Cryptography Research, Inc., 1998, Available at http://www.cryptography.com/dpa/technical/index.html.

Georgios Selimis, et al., "Evaluation of 90nm 6T-SRAM as Physical Unclonable Function for Secure Key Generation in Wireless Sensor Nodes," Conference Paper, International Symposium on Circuits and Systems (ISCAS 2011), May 2011; available at: https://www.researchgate.net/publication/221376945.

An Chen, "Comprehensive Assessment of RRAM-based PUF for Hardware Security Applications", 2015 IEEE International Electron Devices Meeting (IEDM), 2015, p. 10.7.1-10.7.4, downloaded on Jun. 10, 2020.

Po-Hao Tseng, et al., "Error Free Physically Unclonable Function (PUF) with Programmed ReRAM using Reliable Resistance States by Novel ID-Generation Method," Extended Abstracts of the 2017 International Conference on Solid State Devices and Materials, Sendai, 2017 pp. 45-46.

* cited by examiner

AT THE TIME OF PUF DATA REGISTRATION

AT THE TIME OF PUF DATA REPRODUCTION

US 11,195,582 B2

NON-VOLATILE MEMORY DEVICE AND METHOD OF WRITING TO NON-VOLATILE MEMORY DEVICE

CROSS REFERENCE TO RELATED APPLICATIONS

This application is a U.S. continuation application of PCT International Patent Application Number PCT/JP2018/040095 filed on Oct. 29, 2018, claiming the benefit of priority of Japanese Patent Application Number 2018-009148 filed on Jan. 23, 2018, the entire contents of which are hereby incorporated by reference.

BACKGROUND

1. Technical Field

The present disclosure relates to a non-volatile memory device, and more particularly to a non-volatile memory device and the like including a plurality of variable resistance non-volatile memory cells.

2. Description of the Related Art

The market for electronic commerce services provided via the Internet, such as internet banking and internet shopping, is rapidly expanding. As a method of payment in such services, electronic money is used. Accordingly, integrated circuit (IC, hereinafter the same) cards and smartphone terminals that are used as media for electronic money are also being increasingly used. These services always require high-level security techniques for mutual authentication during communication and encryption of communication data in order to ensure secure payment.

In terms of software techniques, encryption techniques based on program processing centered on advanced encryption algorithms have been accumulated, and a sufficient level of security has been achieved. However, advancement of technique has led to a rapid growth of concerns that information inside the circuit can be read directly from the outside by hardware.

SUMMARY

The present disclosure provides a non-volatile memory device having a high tamper resistance.

A non-volatile memory device according to one aspect of the present disclosure includes: a memory group of a plurality of memory cells in which digital data is recorded according to a magnitude of a resistance value, the memory group including at least one data cell and at least one dummy cell which are associated with each other, the plurality of memory cells being variable resistance memory cells; a read circuit which performs, in parallel, a read operation on each of the plurality of memory cells included in the memory group. Dummy data is recorded in the at least one dummy cell, the dummy data being for reducing a correlation between a side-channel leakage and information data recorded in the at least one data cell, the side-channel leakage being generated when the read operation is performed by the read circuit.

The present disclosure provides a non-volatile memory device having a high tamper resistance.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
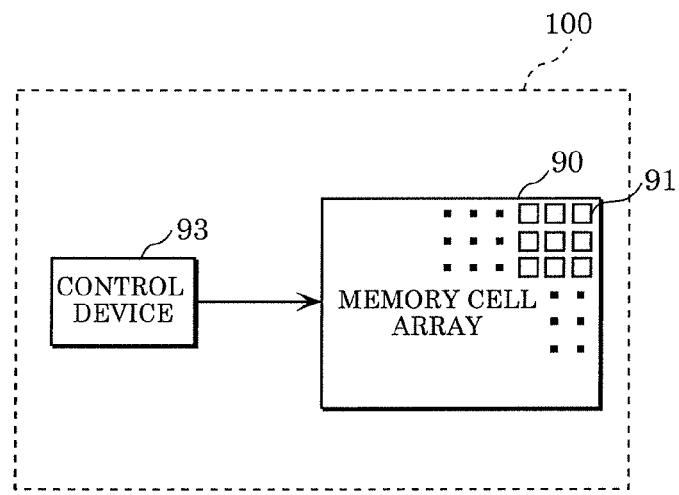
FIG. 1 is a block diagram of an example of a schematic configuration of a variable resistance non-volatile memory device according to an embodiment.

DETAILED DESCRIPTION OF THE EMBODIMENT (Underlying Knowledge Forming Basis of the Present Disclosure)

In general, an IC with enhanced security encrypts confidential information by using an encryption key retained inside the IC, and uses the encrypted information to prevent leakage of information. In this case, it is essential to prevent information of the encryption key (also referred to as a "secret key") held inside the IC from leaking to the outside.

Against the above measure, a scheme called a side-channel attack (SCA) disclosed in Paul Kocher, et al., "Introduction to Differential Power Analysis and Related Attacks", 1998 (NPL 1) proposed by Paul Kocher et al. in 1999 can constitute a threat. In the scheme, an encryption key is identified by using side-channel information, such as power consumption of a semiconductor device when each signal processing circuit is executed and radiated electromagnetic waves that depend on the power consumption. The scheme can be a threat because an attacker (or a hacker) is capable of realizing an attack environment with a relatively inexpensive device, such as an oscilloscope or a commercially available personal computer (PC), and is also capable of hacking key information while the IC is operating without physically damaging the IC.

General SCA is roughly classified into two types. One is simple power analysis (SPA) which focuses on power consumption generated when an encryption processing circuit operates. SPA identifies a secret key by identifying the timing of the encryption operation processing and analyzing fluctuations in power consumption at that time. The other one is differential power analysis (DPA) which estimates a secret key by repeatedly measuring and statistically analyzing data output in the encryption processing circuit and generated power consumption. The encryption processing of the encryption processing circuit which actually uses the secret key is often targeted for such an attack of SCA. In order to address SCA, various countermeasures for encryption processing have been proposed.

Japanese Unexamined Patent Application Publication No. 2007-67942 (PTL 1) attempts to reduce the correlation between side-channel leakage and a secret key by performing encryption processing which uses the secret key and encryption processing which uses a dummy key in random order. The side-channel leakage is any one of electric power, magnetic field, or heat.

Japanese Unexamined Patent Application Publication No. 2006-25366 (PTL 2) discloses an encryption processing technique in which the timing of the encryption processing is unlikely to be identified by mixing dummy operations, while DPA is made to be resistant by making the Hamming weight within the encryption processing circuit constant and making the power consumption during the encryption processing constant.

In addition to the above-described countermeasures for side-channel attacks, recently, a new hardware technique called physically unclonable function (PUF) has been proposed. The PUF technique uses manufacturing variations to generate unique individual identification information that differs from one IC to another. Hereinafter, individual identification information generated by the PUF technique is referred to as "PUF data" in the description of the present disclosure. It can be said that the PUF data is device-specific random number data associated with variations in physical characteristics of the ICs. Since slight variations in physical characteristics are used, physical analysis is difficult and the physical characteristics of each IC cannot be artificially reproduced. Hence, data which cannot be physically copied can be generated.

As a specific example of the conventional techniques, SRAM PUF as disclosed in Georgios Selimis, et al., "Evaluation of 90 nm 6T-SRAM as Physical Unclonable Function for Secure Key Generation in Wireless Sensor Nodes" (NPL 2) can be illustrated. The disclosed example uses a phenomenon in which, in each memory cell in an SRAM, the tendency of whether the initial value of the digital data at the time of power-on of the SRAM is likely to be in state "1" or state "0" differs mainly due to variations in Vt (variations in operating voltage) across the transistor in the memory cell. This tendency is specific to each cell in an SRAM mounted on each IC, and is different from one cell to another. That is, the initial value data at the time of power-on of the SRAM is used as PUF data.

In addition, ReRAM PUF as disclosed in Japanese Unexamined Patent Application Publication No. 2016-105585 (PTL 3), International Publication No. WO2014/119329 (PTL 4), An Chen, "Comprehensive Assessment of RRAM-based PUF for Hardware Security Applications", IEDM 2015 (NPL 3), and P. H. Tseng, et al., "Error Free Physically Unclonable Function (PUF) with Programmed ReRAM using Reliable Resistance States by Novel ID-Generation Method", SSDM 2017 (NPL 4) can be illustrated. In the example of PTL 3, variations in resistance of memory cells in a ReRAM are used. Resistance value information within the memory group is then obtained, a determination value as a reference for binarizing is determined from the obtained resistance value information, and PUF data is generated. NPL 3 discloses a method of generating PUF data by writing two cells to be in the same state, and comparing the magnitude relationship due to the variations in resistance value after writing. In PTL 4 and NPL 4, the randomness of ReRAM forming is used as PUF. In the memory cells of the ReRAM, a voltage stress, called forming, which is greater than a normal rewrite voltage is applied to an initial state having a high resistance value to cause dielectric breakdown, so that the memory cell is changed to a variable state where rewrite is possible. The application time period of the voltage stress required in the process of forming has random characteristics for each memory cell. In this method in the above documents, a voltage stress for a fixed time is applied to a memory group, and processing of voltage stress application ends when forming of about half of the memory cells is completed. As a result, in the memory cell group after the application processing, about half of the memory cells which are in the initial state and the other half of the memory cells which are in the variable state are recorded as random data specific to each device. In this method, the random data is used as PUF data.

By recording PUF data which is a random number specific to each IC using such PUF techniques, the PUF data can be treated as data which is difficult to analyze and which cannot be copied. This PUF data is used, for example, as a device key for encrypting the secret key described above. The secret key encrypted by the device key (PUF data) is stored in an encrypted state in a non-volatile memory. In other words, since the encrypted secret key recorded in the non-volatile memory can be decrypted to the original secret key data only by the device key, the security level of the secret key depends on the security level of PUF.

PUF uses slight variations in physical characteristics. Hence, when PUF data is reproduced relative to the same device, there are several issues including a reduced reproducibility due to susceptibility to the influence of environmental variations such as temperature and power supply or a reduced uniqueness due to physical dependence in manufacturing.

International Publication No. WO2010/100015 (PTL 5) discloses a technique called Fuzzy Extractor as a measure for improving such reproducibility and uniqueness. This is a technique which includes post-processing for PUF data, such as an algorithm or a hash function capable of correcting errors while maintaining the security level of PUF.

Based on the knowledge of the inventors of present application, one aspect of the present disclosure is outlined as follows.

A non-volatile memory device according to one aspect of the present disclosure includes: a memory group of a plurality of memory cells in which digital data is recorded according to a magnitude of a resistance value, the memory group including at least one data cell and at least one dummy cell which are associated with each other, the plurality of memory cells being variable resistance memory cells; a read circuit which performs, in parallel, a read operation on each of the plurality of memory cells included in the memory group. Dummy data is recorded in the at least one dummy cell, the dummy data being for reducing a correlation between a side-channel leakage and information data recorded in the at least one data cell, the side-channel leakage being generated when the read operation is performed by the read circuit.

According to the above aspect, dummy data for reducing the correlation between side-channel leakage and information data (confidential data such as PUF data and other important data) is recorded in at least one dummy cell. Accordingly, side-channel leakage is generated which is different from side-channel leakage generated due to the information data. Hence, the information data is less likely to be estimated from the side-channel leakage generated when a read operation is performed by the read circuit. As a result, tamper resistance can be enhanced.

Moreover, it may be that the non-volatile memory device include a write circuit which performs a write operation for writing the dummy data on the at least one dummy cell, based on the information data recorded in the at least one data cell.

According to the above aspect, dummy data for reducing the correlation can be written to the dummy cell.

Moreover, it may be that physically unclonable function (PUF) data is recorded in the plurality of memory cells, the PUF data being device-specific data in which variations in physical characteristics are used.

According to the above aspect, since PUF data with a high level of security is used, tamper resistance can be further enhanced.

Moreover, it may be that the plurality of memory cells include a plurality of variable memory cell each of which is a memory cell in a variable state where a resistance value reversibly changes between a plurality of variable resistance value ranges in response to an application of a plurality electric signals which are mutually different, and resistance value variations of the plurality of variable memory cells in a same resistance state are used as the variations in physical characteristics used in the PUF data.

According to the above aspect, PUF data can be easily generated by setting the plurality of memory cells to the same resistance state.

Moreover, it may be that the plurality of memory cells include: a variable memory cell which is a memory cell in a variable state where a resistance value reversibly changes between a plurality of variable resistance value ranges in response to an application of a plurality of electric signals which are mutually different; and a memory cell in an initial state where the memory cell does not change to the variable state unless a forming stress is applied, the initial state being in an initial resistance range in which a resistance value does not overlap any of the plurality of variable resistance value ranges, the forming stress being an electric stress which changes the memory cell to the variable state. It may be that variations in a cumulative pulse time period necessary for the forming stress are used as the variations in physical characteristics which are used in the PUF data.

According to the above aspect, PUF data can be easily generated by applying forming stress to a plurality of memory cells.

Moreover, it may be that the PUF data is recorded in the at least one data cell, and error correction data of the PUF data is not recorded in the plurality of memory cells included in the memory group.

According to the above aspect, if error correction data of PUF data (for example, error correction data associated with PUF data in a one-to-one correspondence) is recorded in a plurality of memory cells included in a memory group, the PUF data can be analyzed from the error correction data. However, since the error correction data is not recorded, tamper resistance can be further enhanced. Note that error correction of the PUF data can be performed by helper data generated by Fuzzy Extractor even without using the error correction data. In addition, since dummy data can be recorded in a free area (for example, a dummy cell) generated because the error correction data is not recorded, tamper resistance can be enhanced.

Moreover, it may be that the dummy data is data for setting a Hamming weight of the at least one data cell and the at least one dummy cell to a predetermined value.

According to the above aspect, since the Hamming weight is set to a predetermined value, the side-channel leakage corresponds to the predetermined value, so that the correlation between the side-channel leakage and the information data can be reduced.

Moreover, it may be that the dummy data is random number data.

According to the above aspect, since the Hamming weight has a value corresponding to the random number data, the side-channel leakage corresponds to the random number data. As a result, the correlation between the side-channel leakage and the information data can be reduced.

Moreover, it may be that the plurality of memory cells include a variable memory cell which is a memory cell in a variable state where a resistance value reversibly changes between a plurality of variable resistance value ranges in response to an application of a plurality of electric signals which are mutually different, the at least one dummy cell is the variable memory cell, and the dummy data is a resistance value in a same resistance state.

According to the above aspect, PUF data can be used as dummy data in the data cell as well as in the dummy cell.

A writing method according to one aspect of the present disclosure is a method of writing to a non-volatile memory device including: a memory group of a plurality of memory cells in which digital data is recorded according to a magnitude of a resistance value, the memory group including at least one data cell and at least one dummy cell which are associated with each other, the plurality of memory cells being variable resistance memory cells; and a read circuit which performs, in parallel, a read operation on each of the plurality of memory cells. The method includes: writing dummy data to the at least one dummy cell, the dummy data being for reducing a correlation between a side-channel leakage and information data recorded in the at least one data cell, the side-channel leakage being generated when the read operation is performed by the read circuit.

With this, a non-volatile memory having a high tamper resistance can be provided.

Hereinafter, the details of the present disclosure based on the knowledge described above will be described with reference to the attached drawings.

The embodiment described below shows one specific example. The numerical values, shapes, materials, structural elements, arrangement positions and connection forms of the structural elements, steps, order of steps, and the like indicated in the following embodiment are merely examples, and do not intend to limit the present disclosure. Among the structural elements in the following embodiment, the structural elements which are not recited in the independent claim indicating the highest concept of the present disclosure are described as optional structural elements. In the drawings, the descriptions of the structural elements with the same reference numerals may be omitted. Moreover, the drawings illustrate each structural element schematically for the sake of facilitating understanding, and the shape, the size, and the like of each structural element may not be accurately illustrated. In addition, in the manufacturing method, the order of each step can be changed as needed, and other known steps can be added.

Embodiment

[Outline of Variable Resistance Non-Volatile Memory Device Used in the Present Disclosure]

Figure 2:
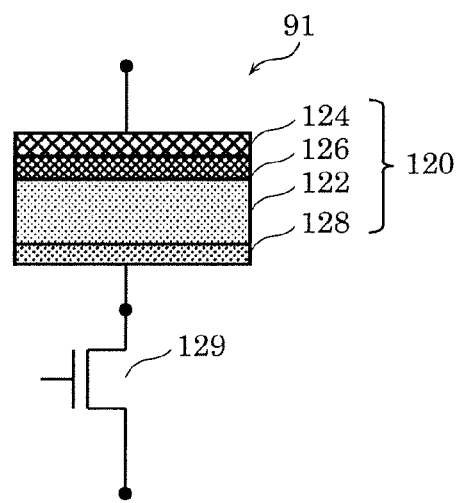
FIG. 2 is a cross-sectional view of an example of a schematic configuration of a memory cell included in the variable resistance non-volatile memory device according to the embodiment.

FIG. 1 is a block diagram of an example of a schematic configuration of variable resistance non-volatile memory device 100 according to an embodiment. FIG. 2 is a cross-sectional view of an example of a schematic configuration of memory cell 91 included in variable resistance non-volatile memory device 100 according to the embodiment. In the following description, a variable resistance non-volatile memory device is also referred to simply as a non-volatile memory device.

In the example illustrated in FIG. 1, non-volatile memory device 100 according to the present embodiment includes at least memory cell array 90 and control device 93. Control device 93 does not always have to be part of non-volatile memory device 100, and the operation described below may be performed using a control device externally connected to non-volatile memory device 100.

Memory cell array 90 includes an array of a plurality of variable resistance memory cells 91 into which digital data is recorded according to the magnitude of a resistance value. Although the details will be described later, memory cell array 90 includes a memory group of the plurality of memory cells 91 including at least one data cell and at least one dummy cell which are associated with each other. In the present embodiment, memory cell array 90 includes a plurality of memory groups. A data cell is an information cell in which actual information data, such as a secret key and user data, is recorded. A dummy cell is a cell in which dummy data for reducing the correlation between side-channel leakage generated when information is read from the memory group and information data is recorded. Note that the term "recorded" above may indicate either the state "is currently being recorded" or the state of "will be recorded in the future". The same also applies to term "recorded" in the following description.

Control device 93 executes writing to the dummy cell according to the resistance state of memory cell 91 recorded in the data cell. When reading the data recorded in the data cell, read operations are performed in parallel on the data cell and the dummy cell associated with the data cell. In other words, read operations are performed in parallel on a memory group basis. A resistance value for reducing the correlation between side-channel leakage generated when a read operation is performed and the information data recorded in the data cell is written to the dummy cell.

In the example illustrated in FIG. 2, variable resistance element 120 included in memory cell 91 includes base layer 122 (for example, $Ta_2O_5$), first electrode 124 (for example, Ir), and variable resistance layer 126 (for example, $TaO_x$) and second electrode 128 (for example, TaN). Transistor 129 for selecting a specific memory cell is connected to each memory cell 91.

Memory cell 91 has characteristics in which the resistance value can reversibly change between a plurality of variable resistance value ranges in response to an application of a plurality of different electric signals. The variable resistance value ranges include a resistance value range in which the memory cell is in a low resistance state as one state of digital information, and a resistance value range in which the memory cell is in a high resistance state as another state of the digital information. The high resistance state is higher in resistance than the low resistance state. In this way, in the variable state, the resistance value can be reversibly changed between the low resistance state and the high resistance state.

Memory cell 91 also has characteristics of being able to assume an initial state. The "initial state" refers to a state in which the resistance value is within an initial resistance value range which does not overlap with any of the variable resistance value ranges. The memory cell in the initial state does not change to the variable state unless forming is performed on the memory cell in the initial state. The "forming" refers to a process of applying a predetermined electrical stress to a memory cell to change the memory cell to be in a state where the resistance value of the memory cell reversibly changes between a plurality of variable resistance value ranges.

The electrical stress (forming stress) applied for forming may be, for example, an electrical pulse with a predetermined voltage and a duration, or may be a combination of a plurality of electrical pulses. The forming stress may be a cumulative stress. In that case, when the amount of cumulative stress exceeds a predetermined amount, memory cell 91 changes from the initial state to the variable state.

In the present embodiment, each memory cell 91 has such characteristics that memory cell 91 does not assume a state where the resistance value reversibly changes between a plurality of variable resistance value ranges, unless forming is performed after manufacturing. In other words, a description will be given where each variable resistance element which is after being manufactured by a semiconductor process or the like and before the forming stress is applied is in an initial state.

However, the characteristics described above are an example and are not essential. Each of memory cells 91 does not have to be an element that can assume an initial state, and may be, for example, a so-called forming-less element having only a variable state.

Arbitrarily set data pattern of memory cell array 90 is recorded according to the difference in variable state of each of memory cells 91, and is used. Additionally, it may be used as PUF which is random individual identification information which corresponds to the physical characteristics. In an example of the PUF, resistance value variations of respective memory cells in the same resistance state are used. Even in the same resistance state, the resistance values slightly vary. In the PUF in the example, such characteristics are used. In memory cell array 90, a plurality of memory cells 91 are all set to the same resistance state as a variable state, and are treated as a memory group in which PUF data is recorded.

Figure 3:
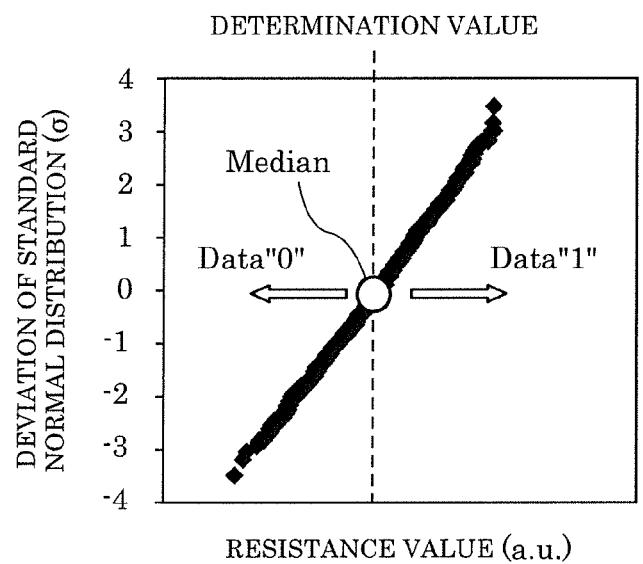
FIG. 3 is a plot of a relationship between normalized resistance value information in the same resistance state and the deviation of standard normal distribution of variations in the resistance value information.

FIG. 3 is a plot of a relationship between standardized resistance value information in the same resistance state and the deviation of standard normal distribution of variations in the resistance value information. As illustrated in FIG. 3, the distribution of the variations in resistance value of the memory cells is substantially linear in accordance with the normal distribution. This shows that the variations in resistance value are a very random phenomenon. FIG. 3 illustrates an example in which digital data is output by setting the median value of the distribution of variations in resistance value as a determination value, and assigning data "1" when the resistance value is greater than the determination value and assigning data "0" when the resistance value is less than the determination value.

In another example, variations in cumulative pulse application time period, during which forming on a memory cell in the initial state is completed, are used.

Figure 4:
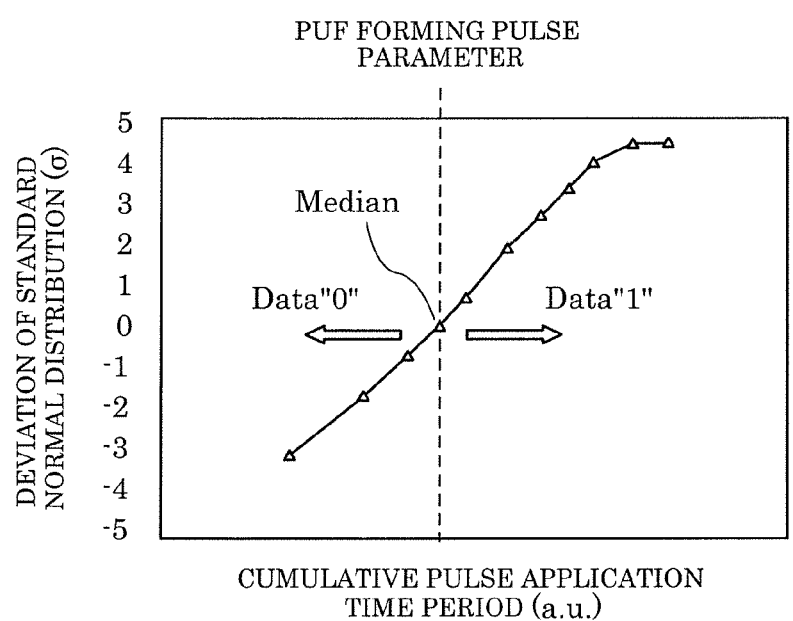
FIG. 4 is a plot of a relationship between standardized information of cumulative pulse application time period until completion of forming and the deviation of standard normal distribution of variations in the cumulative pulse application time period.

FIG. 4 is a plot of a relationship between standardized information of cumulative pulse application time period taken till completion of forming and the deviation of standard normal distribution of variations in cumulative pulse application time period. It can be understood that the forming characteristics of the memory cells are approximately linearly distributed with respect to the cumulative pulse application time period. From this, it can be said that variations in cumulative pulse application time period in the forming process are significantly random phenomenon in a similar manner to variations in resistance value. In the example illustrated in FIG. 4, a parameter of a fixed time period for completion of forming is set as a forming pulse parameter to about half of the memory cells in the PUF data area, and the forming process is performed on memory cells in the PUF data area during the fixed time period. Subsequently, in the PUF data area after the application of the forming pulse, forming on about half of the memory cells is completed, and the half of the memory cells change to the variable state (in other words, about the other half remains in the initial state). For example, FIG. 4 illustrates an example in which digital data is output by assigning "1" to the memory cells changed to a variable state and "0" to the memory cells remained in the initial state.

[Configuration and Basic Circuit Operation of Variable Resistance Non-Volatile Memory Device]

Figure 5:
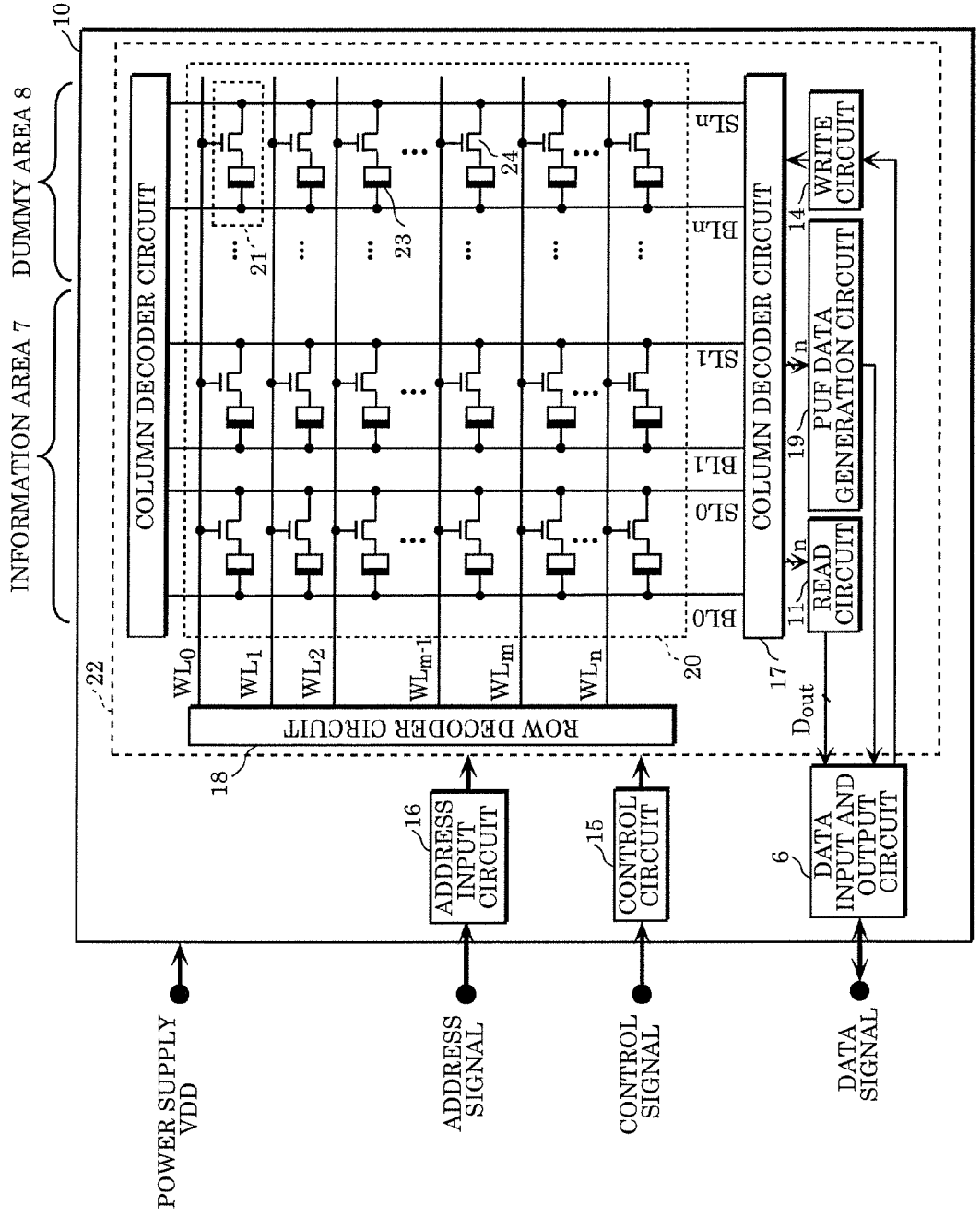
FIG. 5 is a block diagram of a specific configuration example of the non-volatile memory device according to the embodiment.

FIG. 5 is a block diagram of a specific configuration example of non-volatile memory device 10 according to the present embodiment. Non-volatile memory device 10 is a specific example of non-volatile memory device 100 described above, and the specific configuration of the non-volatile memory device according to the present embodiment is not limited to the configuration illustrated in FIG. 5.

As illustrated in FIG. 5, non-volatile memory device 10 according to the present embodiment includes memory main body 22 on a semiconductor substrate. Non-volatile memory device 10 further includes data input and output circuit 6, control circuit 15, and address input circuit 16.

Memory main body 22 includes read circuit 11, write circuit 14, column decoder circuit 17, row decoder circuit 18, PUF data generation circuit 19, and memory cell array 20.

Write circuit 14 writes data by applying a predetermined voltage in each operation to selected memory cell 21. For example, write circuit 14 performs a write operation of dummy data on at least one dummy cell in dummy area 8 to be described later, based on information data recorded in at least one data cell in information area 7 to be described later.

Read circuit 11 performs read operations in parallel on each of a plurality of memory cells 21 included in a memory group. For example, the memory group is a group including a plurality of memory cells 21 associated with a word line, and memory cell array 20 includes a memory group for each word line. Hence, read circuit 11 performs a read operation, for example, on a memory group basis. Read circuit 11 detects a change in current flowing through a bit line by a reading method to be described later, and outputs the detected change as digital data of a selected memory cell.

PUF data generation circuit 19 generates PUF data. Specifically, PUF data generation circuit 19 obtains the resistance values of the plurality of memory cells 21 in the same resistance state, and calculates the median value of the obtained resistance values as a determination value. PUF data generation circuit 19 then generates PUF data by determining whether or not the obtained resistance value is greater than the determination value. Note that the calculation of the median value of the obtained resistance values as a determination value, the determination of whether or not the obtained resistance value is greater than the determination value, and the generation of the PUF data do not have to be performed by memory main body 22, but may be performed outside memory main body 22.

Row decoder circuit 18 selects one word line WL from a plurality of m word lines WL connected to memory cell array 20.

Column decoder circuit 17 selects k bit lines BL (where k is the number of parallel reads (the number of memory cells included in a memory group)) and corresponding k source lines SL from among n bit lines BL (where n is a plural number) and n source lines SL. Column decoder circuit 17 then connects the selected bit lines BL and source lines SL to write circuit 14 and read circuit 11. These circuits (write circuit 14, read circuit 11, PUF data generation circuit 19, row decoder circuit 18 and column decoder circuit 17) operate in accordance with the number of rows and/or columns read and/or written in parallel.

Read circuit 11 of non-volatile memory device 10 includes output Dout. The k memory cells selected by column decoder circuit 17 and row decoder circuit 18 are connected to read circuit 11 via k bit lines, so that Dout which is the digital data of the k memory cells is transmitted to data input and output circuit 6. The k memory cells selected by column decoder circuit 17 and row decoder circuit 18 are connected to PUF data generation circuit 19 via k bit lines, so that PUF data of the k memory cells is transmitted to data input and output circuit 6.

Memory main body 22 includes information area 7 and dummy area 8 as storage areas. Information area 7 includes data cells, and arbitrary data (user data) and security data, such as encryption key and PUF data, are stored in information area 7. In contrast, dummy area 8 includes dummy cells. Data for reducing the correlation with side-channel leakage generated when read operations are performed in parallel is written to dummy area 8 based on the data written to information area 7.

Information area 7 and dummy area 8 do not have to be divided by the bit lines as illustrated in FIG. 5, and may be divided into given areas on memory cell array 20. As the regularity of division of physical areas becomes more complex, the resistance to attacks, such as hacking, increases. Additionally, information area 7 may be further subdivided according to the importance of security so that access can be restricted. For example, user access to the security data, such as an encryption key and PUF data, may be restricted. In dummy area 8, too, for example, parity information used for error correction may be written or may be used as redundant bits treated as a replacement for a defective bit line at the time of inspection.

Memory cell array 20 includes a plurality of word lines WL0, WL1, WL2, . . . , WLn, a plurality of bit lines BL0, BL1, . . . , BLn which extend parallel to each other and intersect the word lines, and a plurality of source lines SL0, SL1, SL2, . . . , SLn which extend parallel to each other and parallel to the bit lines, and intersect the word lines. Among the plurality of bit lines BL0, BL1, . . . , BLn and the plurality of source lines SL0, SL1, SL2, . . . , SLn, p lines (where p is an integer satisfying the relation of 1≤p≤n) are assigned as dummy area 8 and the rest of the lines are assigned as information area 7. Memory cells 21 are disposed at three-dimensional intersections of the word lines and the bit lines.

Each memory cell 21 includes variable resistance element 23 and transistor 24. Word lines WL0, WL1, WL2, . . . , WLn are connected to the gate terminals of respective transistors 24. Bit lines BL0, BL1, . . . , BLn are connected to the second electrodes of variable resistance elements 23 included in respective memory cells 21. The first electrode of variable resistance element 23 is connected to the second main terminal of transistor 24, respectively. Source lines SL0, SL1, SL2, . . . , SLn are connected to the first main terminals of transistors 24, respectively.

Variable resistance element 23 operates as a non-volatile memory element in memory cell 21. Non-volatile memory device 10 is a so-called 1T1R variable resistance non-volatile memory device in which each memory cell 21 includes one transistor 24 and one variable resistance element 23. The selection element of each of the memory cells is not limited to the above-described transistor. For example, a two-terminal element, such as a diode, may be used.

Control circuit 15 selects one of the bit line or the source line for column decoder circuit 17 based on the control signal, and connects the selected line to write circuit 14 at the time of writing, and to read circuit 11 at the time of reading. Control circuit 15 then operates write circuit 14 or read circuit 11.

Variable resistance element 23 can have the same configuration as variable resistance element 120 described above in the embodiment, and thus the detailed description thereof will be omitted.

In the example illustrated in FIG. 5, an NMOS transistor is used as a selection transistor of memory cell array 20, but the present disclosure is not limited to such an example, and a PMOS transistor may be used.

Figure 6:
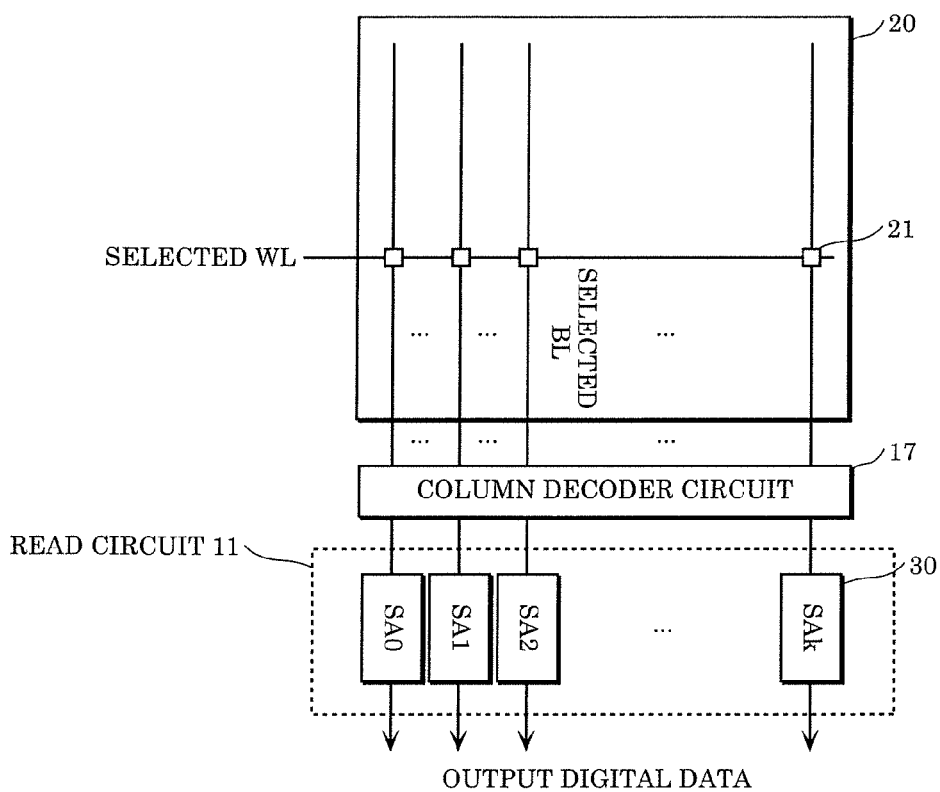
FIG. 6 illustrates a configuration example of a read circuit included in the non-volatile memory device.

FIG. 6 illustrates a configuration example of read circuit 11 included in non-volatile memory device 10. FIG. 6 also illustrates memory cell array 20 and column decoder circuit 17 in addition to read circuit 11. Read circuit 11 includes k (where k is an integer satisfying the relation of 1≤k≤n) sense amplifier circuits 30 (SA0, SA1, SA2, . . . , SAk) to perform read operations in parallel on a memory group basis where each memory group includes k memory cells 21. The k bit lines selected by column decoder circuit 17 are respectively connected to k sense amplifier circuits 30. Each sense amplifier circuit 30 outputs digital data of connected memory cell 21.

Figure 7:
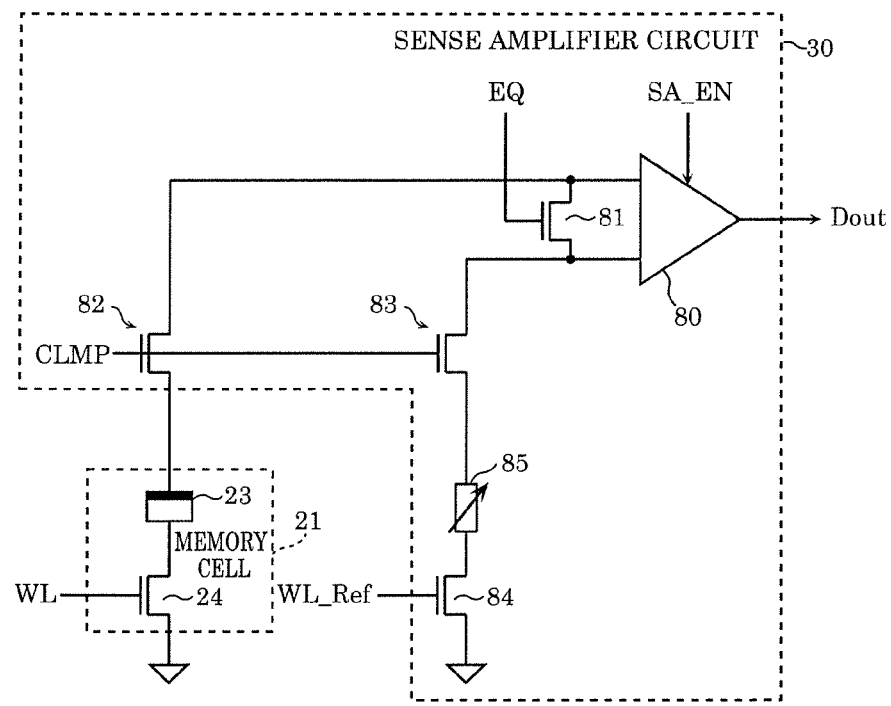
FIG. 7 is a circuit diagram of a configuration example of a sense amplifier circuit included in the read circuit.

FIG. 7 is a circuit diagram of a configuration example of sense amplifier circuit 30 included in read circuit 11. FIG. 7 also illustrates memory cell 21 connected to sense amplifier circuit 30. Sense amplifier circuit 30 includes comparator 80, equalizing transistor 81, and clamp transistors 82 and 83. Signal SA_EN is connected to comparator 80. Comparator 80 has one input terminal to which a first main terminal of equalizing transistor 81 and a first main terminal of clamp transistor 82 are connected, and the other input terminal to which a second main terminal of equalizing transistor 81 and a first main terminal of clamp transistor 83 are connected. Signal EQ is connected to the gate terminal of equalizing transistor 81. Selected memory cell 21 is connected to a second main terminal of clamp transistor 82, and reference cell 85 is connected to a second main terminal of clamp transistor 83.

Figure 8:
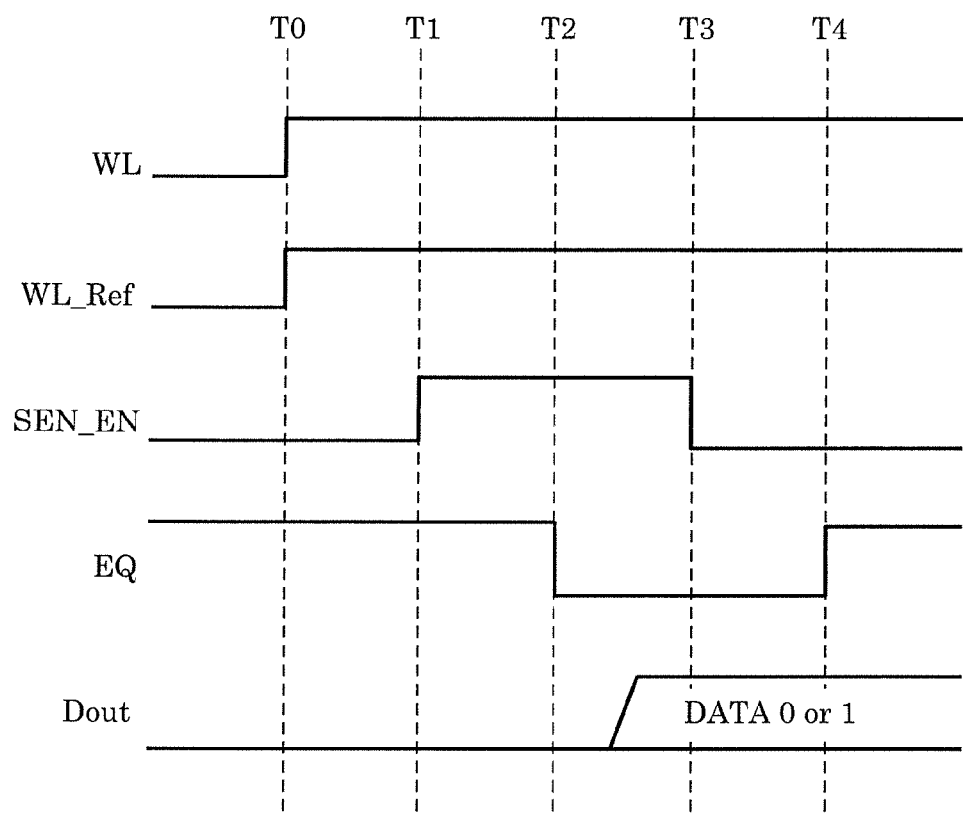
FIG. 8 is a timing chart when the read circuit reads the selected memory cell.

Here, an operation of read circuit 11 for outputting the digital data of selected memory cell 21 will be specifically described with reference to the configuration diagram of the read circuit in FIG. 7 and the timing chart in FIG. 8. FIG. 8 is a timing chart when read circuit 11 reads selected memory cell 21.

At timing T0, word line WL of selected memory cell 21 and word line WL of reference cell 85 become high level (that is, transistor 24 corresponding to selected memory cell 21 and transistor 84 corresponding to reference cell 85 are turned on), so that each selected memory cell 21 and sense amplifier circuit 30 are connected.

At timing T1, enable signal SEN_EN of sense amplifier circuit 30 becomes high level, so that comparator 80 in sense amplifier circuit 30 changes to the standby state. Since equalizing signal EQ connected to the gate terminal of equalizing transistor 81 at this time has a high level, the input terminals of comparator 80 are electrically connected to each other and set to the same potential.

At timing T2, equalizing signal EQ becomes low level, so that the state where the input terminals of comparator 80 have a same potential is released, and one of the input terminals of comparator 80 starts discharging depending on the resistance value of selected memory cell 21, and the other input terminal of comparator 80 starts discharging depending on the resistance value of reference cell 85. Here, when the resistance value of selected memory cell 21 is greater than the resistance value of reference cell 85, a low level is output from output Dout of comparator 80, and when the resistance value of selected memory cell 21 is less than the resistance value of reference cell 85, a high level is output from output Dout of comparator 80. Subsequently, the value of the digital data is provided to data input and output circuit 6.

At timing T3, signal SEN_EN is set to the low level, so that the operation of comparator 80 is stopped.

At timing T4, signal EQ is set to the high level again, so that the input terminals of comparator 80 are electrically connected to each other and have the same potential.

Note that read circuit 11 configured as in FIG. 7 includes k sense amplifier circuits 30 in non-volatile memory device 10 according to the present embodiment. Accordingly, up to k sense amplifier circuits 30 can be operated in parallel.

Example 1

Figure 9:
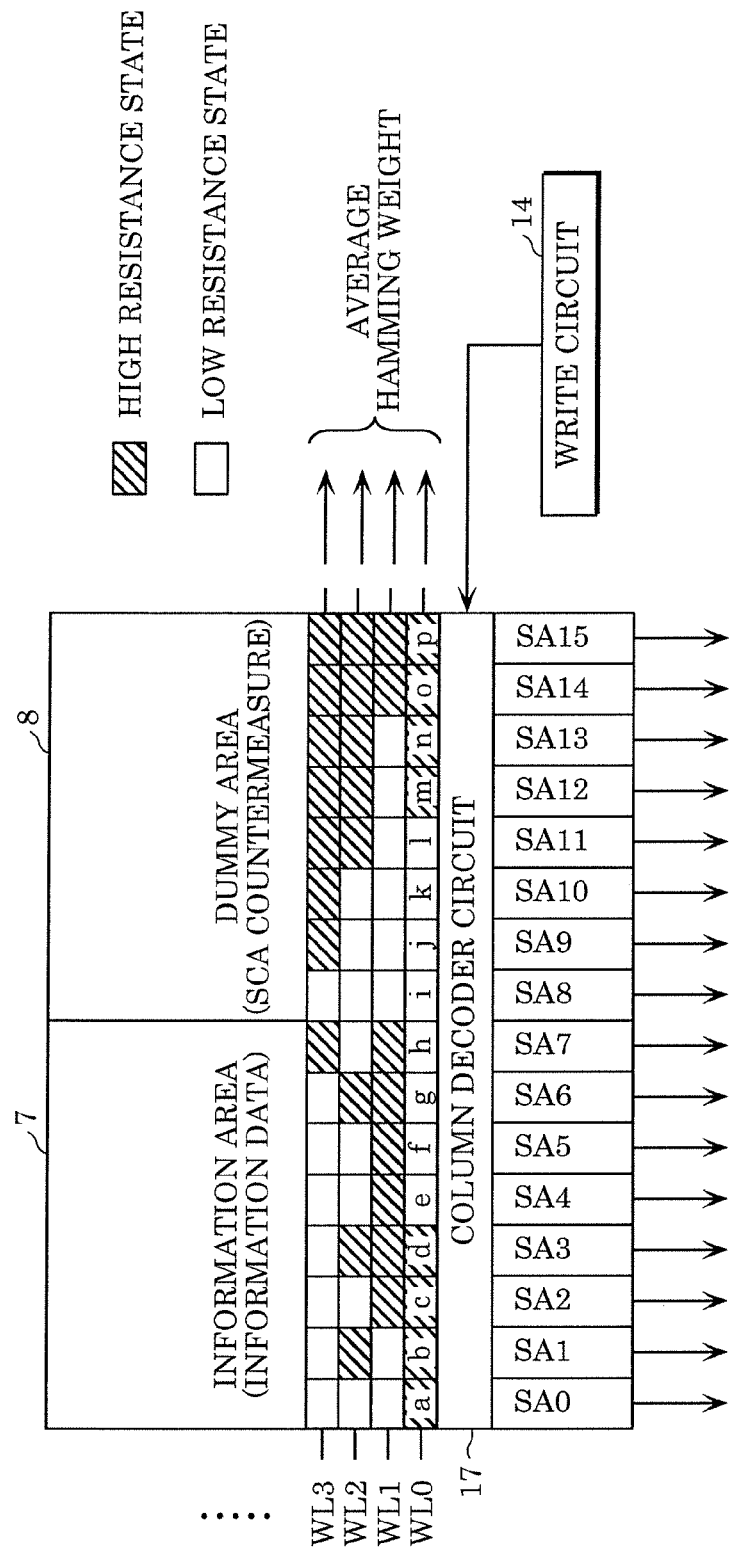
FIG. 9 illustrates data patterns of memory groups generated by an operation of a non-volatile memory device according to Example 1.

FIG. 9 illustrates data patterns of memory groups generated by an operation of non-volatile memory device 10 according to Example 1. Each of the memory groups includes at least one data cell and at least one dummy cell which are associated with each other. Data cells are memory cells included in information area 7, and dummy cells are memory cells included in dummy area 8. FIG. 9 illustrates memory groups respectively corresponding to word lines WL0 to WL3. In the present example, k=16, the number of sense amplifier circuits 30 is sixteen, the number of data cells is eight, and the number of dummy cells is eight. For example, focusing on word line WL0, the memory group corresponding to word line WL0 includes sixteen memory cells a to p. Specifically, memory cells a to h are data cells included in information area 7, and memory cells i to p are dummy cells included in dummy area 8. Read operations are performed on memory cells a to p in parallel, and write operations are performed on memory cells a to p in parallel.

Figure 10:
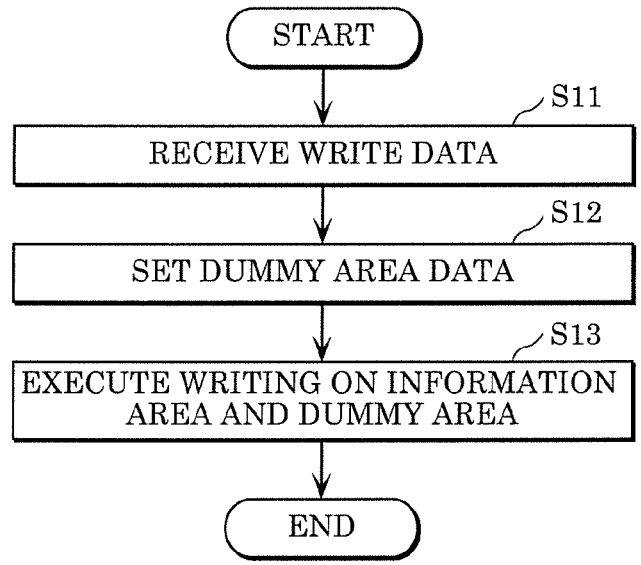
FIG. 10 is a flowchart of an operation example of the non-volatile memory device according to Example 1.

FIG. 10 is a flowchart of an operation example of non-volatile memory device 10 according to Example 1. Hereinafter, an operation of non-volatile memory device 10 will be described with reference to FIG. 9 and FIG. 10.

In step S11, write circuit 14 receives the write data pattern information of information area 7 from data input and output circuit 6. In step S12, write circuit 14 sets the data pattern to be written to dummy area 8 based on the write data received in step S11. For example, the data to be written in dummy area 8 is set such that the Hamming weight of information area 7 and dummy area 8 of the memory group including a plurality of memory cells selected by common word line WL is always constant (predetermined value).

For example, as illustrated in FIG. 9, the memory cell group read by sense amplifier circuits SA0 to SA7 are included in information area 7, the memory cell group read by sense amplifier circuits SA8 to SA15 are included in dummy area 8, and setting is made such that the Hamming weight is constantly "8" as the predetermined value. For example, it is assumed that the memory cell in the high resistance state is data 0 and the memory cell in the low resistance state is data 1. When word line WL0 is selected, the data pattern to be written to the memory cells a to h in information area 7 is "00001111" with the Hamming weight that is "4". Hence, for example, by writing the data pattern of "11110000" with the Hamming weight that is "4" to memory cells i to p in dummy area 8, the Hamming weight of the memory group of word line WL0 read in parallel is "8". In a similar manner, relative to word line WL2, too, the data pattern written to information area 7 is "10101101" with the Hamming weight that is "5", so that data of "11100000" with the hamming weight that is "3" is set to the memory cells in dummy area 8. The data pattern of dummy area 8 may be any pattern as long as the Hamming weight is constant. As described above, by adjusting the memory cells in dummy area 8 such that the Hamming weight is always constant with respect to the memory group on which reading is performed in parallel, the correlation between the side-channel leakage at the time of the read operation and the data recorded in the memory cells in information area 7 is reduced.

In step S13, writing of the data pattern set in step S12 is performed on information area 7 and dummy area 8, so that data is recorded in non-volatile memory device 10. As described above, write circuit 14 performs a write operation of dummy data on at least one dummy cell, based on the information data recorded in at least one data cell. Although write circuit 14 generates the data pattern of the dummy cell after write circuit 14 receives the write data in the present example, the data to be written to the dummy cell may be externally generated in advance. In addition, writing to the dummy cell is also performed at the timing of writing to the data cell in information area 7. However, for example, after performing the writing process on information area 7, reading of the data written to information area 7 may be performed and writing to the dummy cell may be performed according to the result of the reading.

As described above, non-volatile memory device 10 includes: a memory group of a plurality of variable resistance memory cells in which digital data is recorded according to the magnitude of a resistance value, the plurality of memory cells including at least one data cell and at least one dummy cell which are associated with each other; and read circuit 11 which performs read operations in parallel on each of the plurality of memory cells included in the memory group. Dummy data, for reducing the correlation between the side-channel leakage generated when a read operation is performed by read circuit 11 and the information data recorded in at least one data cell, is recorded in at least one dummy cell.

According to the above aspect, since dummy data for reducing the correlation between the side-channel leakage and the information data is recorded in at least one dummy cell, side-channel leakage which is different from side-channel leakage caused due to the information data is generated. Accordingly, it is less likely that the information data is estimated from the side-channel leakage generated when the read operation is performed by read circuit 11. Hence, tamper resistance can be enhanced.

Specifically, the dummy data recorded in at least one dummy cell (here, eight dummy cells) in dummy area 8 is data for setting the Hamming weight of at least one data cell (here, eight data cells) and at least one dummy cell to a predetermined value (here, 8). Hence, the side-channel leakage corresponds to the predetermined value, so that the correlation between the information data recorded in the data cell and the side-channel leakage can be reduced.

Example 2

Since Example 2 relates to PUF data, a general PUF operation system will be described first, and then an example of an operation of non-volatile memory device 10 according to Example 2 will be described.

First, the flow of PUF data registration will be described with reference to FIG. 11 and FIG. 12.

Figure 11:
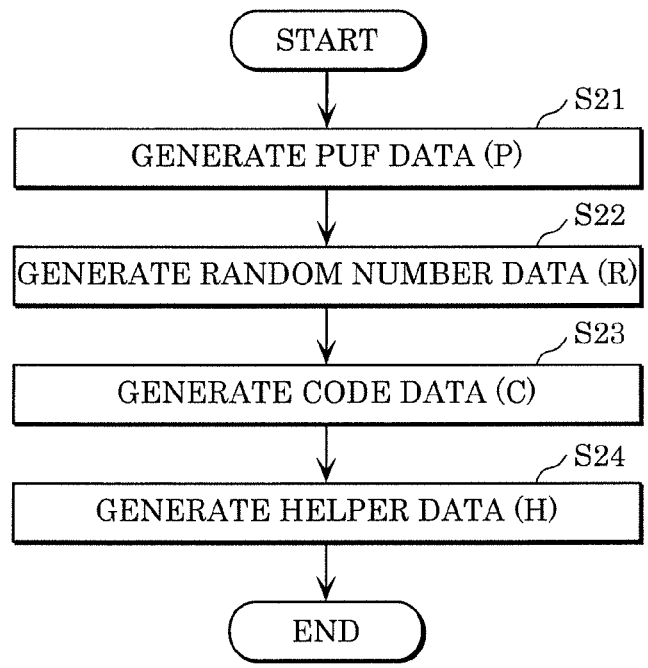
FIG. 11 is a flowchart of an operation example of a non-volatile memory device according to Example 2 at the time of PUF data registration.
Figure 12:
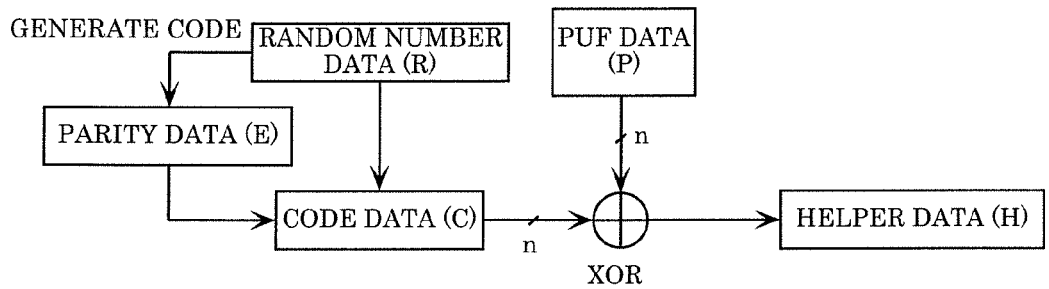
FIG. 12 illustrates an operation of the non-volatile memory device according to Example 2 at the time of PUF data registration.

FIG. 11 is a flowchart of an operation example of non-volatile memory device 10 at the time of PUF data registration according to Example 2. FIG. 12 illustrates an operation of non-volatile memory device 10 at the time of PUF data registration according to Example 2.

In step S21, for example, variations in resistance value of the memory cells in the PUF area set to the low resistance state are detected, and PUF data (P) with n-bits is generated. In step S22, random number data (R) is generated separately from the PUF data. In step S23, code data (C) having a bit length of n bits, which is the combination of the generated random number data (R) and parity data (E) that is error correction data. As an example, PUF data (P) is 16 bits (n=16), and accordingly, random number data (R) is 5 bits, parity data (E) is 11 bits, and code data (C) is 16 bits. In step S24, helper data (H) is generated by encrypting the PUF data (P) generated in step S21 and the code data (C) generated in step S21 with XOR. The helper data (H) is stored in information area 7 in a similar manner to normal memory data.

The PUF data is registered, for example, at the time of manufacturing of non-volatile memory device 10 at a factory etc., and random number data (R), parity data (E) and code data (C) are used at that time, and are not recorded in non-volatile memory device 10. Hence, if the code data (C)

is identified, it is possible to estimate the PUF data (P) from the code data (C), but as long as the code data (C) is not leaked etc., the PUF data (P) cannot be estimated from the code data (C).

Moreover, the helper data (H) is data which is stored in information area 7 and which can be analyzed. However, since the helper data (H) is data obtained by encrypting the PUF data (P) and the code data (C) with XOR, the PUF data (P) cannot be estimated from the helper data (H).

Next, the flow of PUF data reproduction will be described with reference to FIG. 13 and FIG. 14.

Figure 13:
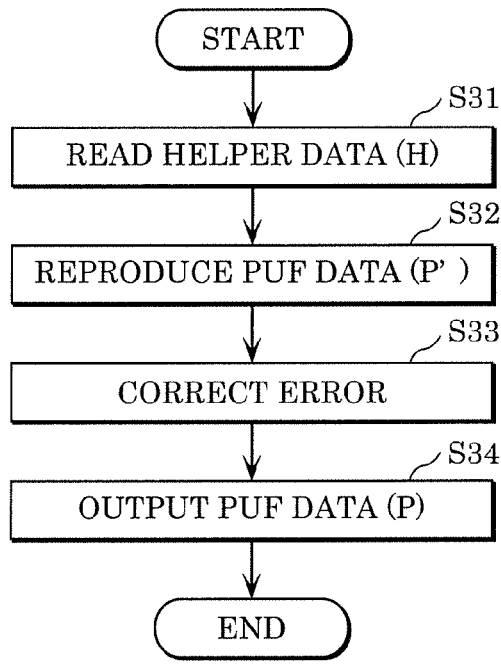
FIG. 13 is a flowchart of an operation example of the non-volatile memory device according to Example 2 at the time of PUF data reproduction.
Figure 14:
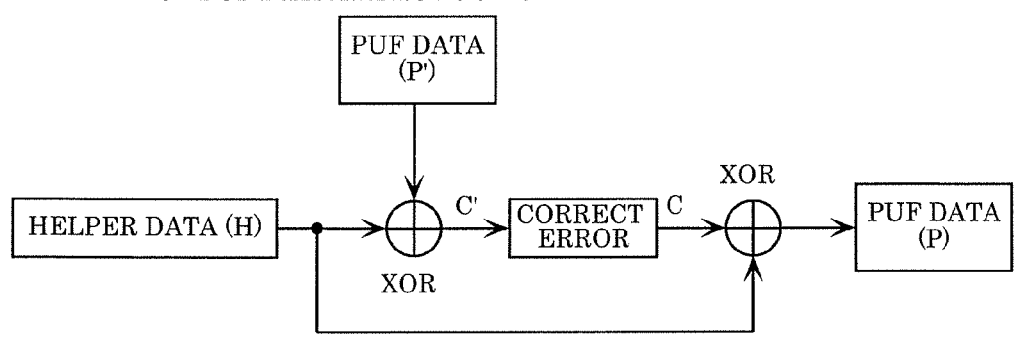
FIG. 14 illustrates an operation of the non-volatile memory device according to Example 2 at the time of PUF data reproduction.

FIG. 13 is a flowchart of an operation example of non-volatile memory device 10 according to Example 2 at the time of PUF data reproduction. FIG. 14 illustrates an operation of non-volatile memory device 10 according to Example 2 at the time of PUF data reproduction.

In step S31, the helper data (H) recorded in information area 7 is read out, and in step S32, PUF data (P') is reproduced from the PUF area. The PUF data (P') obtained at this time may be equal to the PUF data (P) or may contain errors. The reason is as follows. Although the PUF data uses the variations in resistance value in the same resistance state, the variations are slight variations. The variations are likely to be influenced by environmental variations such as temperature and power supply, and cannot be said to have high reproducibility. Every time the PUF data is reproduced from the PUF area, the PUF data may be different data.

In step S33, code data (C') is generated by decoding the helper data (H) read in step S31 and the PUF data (P') reproduced in step S32 with XOR. By performing error correction on the obtained code data (C'), the original code data (C) can be obtained. In step S34, PUF data (P) at the time of registration can be reproduced by decoding the code data (C) corrected in step S33 and the helper data (H) with XOR. In this way, even if there is no error correction data for PUF data, PUF data (P) obtained by correcting PUF data (P') can be reproduced. Although the processing described with reference to FIG. 11 and FIG. 13 is performed by, for example, PUF data generation circuit 19, the present embodiment is not limited to such an example. The processing may be performed by another structural element of non-volatile memory device 10 or may be performed by a structural element outside non-volatile memory device 10.

In general error correction, parity data (error correction data) corresponding to data is added to perform error correction, and both the data and the parity data are stored in a non-volatile memory. For example, when parity data is added to PUF data and stored in a non-volatile memory, the parity data is associated with the PUF data in a one-to-one correspondence. This leads to a risk that the PUF data is estimated from parity data information. However, the error correction method of PUF data described in the present example is an example of an error correction method called Fuzzy Extractor. In the method, since parity data is added to unpredictable random number data, and data generated by encryption of the generated PUF data and the parity data with XOR is stored as helper data, PUF data is unlikely to be predicted from the helper data. In other words, Fuzzy Extractor can realize more secure error correction than conventional error correction methods.

Hereinafter, an operation example of non-volatile memory device 10 according to Example 2 will be described based on the PUF operation system described above.

Figure 15:
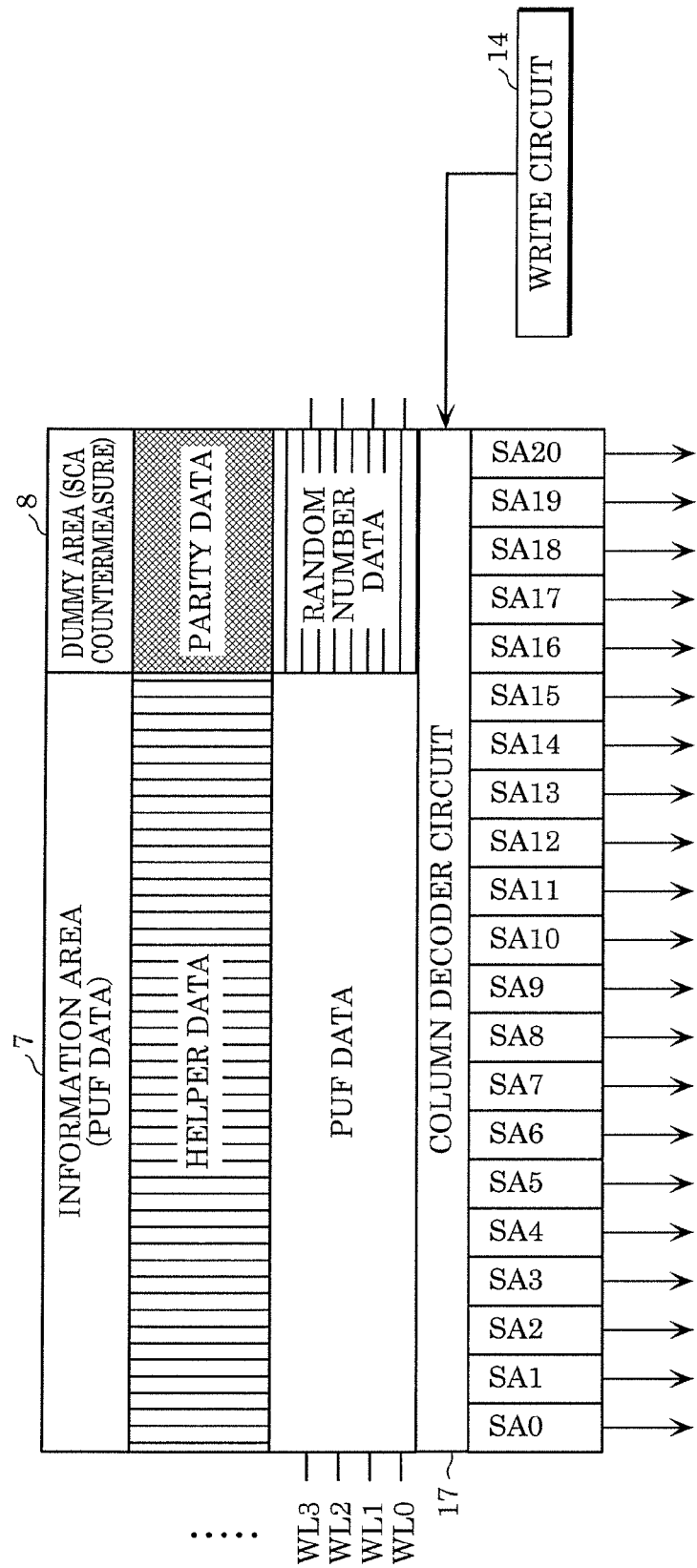
FIG. 15 illustrates a data structure of a memory cell array of the non-volatile memory device according to Example 2.

FIG. 15 illustrates a data structure of the memory cell array of non-volatile memory device 10 according to Example 2. In Example 2, k=21, the number of sense amplifier circuits 30 is twenty-one, the number of data cells is sixteen, and the number of dummy cells is five. In non-volatile memory device 10, the memory cell group read by sense amplifier circuits SA0 to SA15 is assigned as information area 7, and the memory cell group read by sense amplifier circuits SA16 to 20 is assigned as dummy area 8.

In information area 7, PUF data and helper data used for error correction of the PUF data are recorded. Moreover, since the PUF data in Example 2 uses resistance variations as unique ID data, all of PUF data is seemingly in the same resistance state, and, for example, is in a low resistance state (for example, state "1"). In a memory group in which PUF data is recorded in the data cells, the data cells may include one or more memory cells that are not in the same resistance state. On the other hand, helper data is recorded in two states including a low resistance state (for example, state "1") and a high resistance state (for example, state "0"), in a similar manner to normal memory data.

Figure 16:
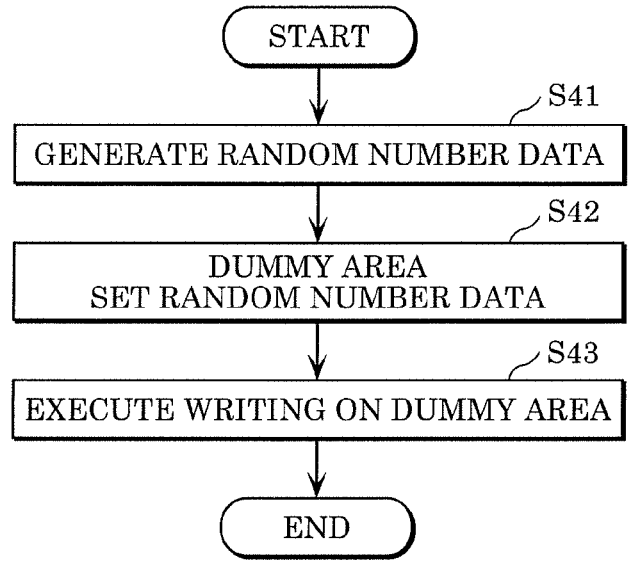
FIG. 16 is a flowchart of an operation example of the non-volatile memory device according to Example 2.

FIG. 16 is a flowchart of an operation example of non-volatile memory device 10 according to Example 2. Hereinafter, the operation up to and including the setting of the resistance values in dummy area 8 will be described with reference to FIG. 15 and FIG. 16.

In step S41, random number data is generated. The random number data may be random number data generated by a random number generator mounted inside the chip, or may be random number data input from the outside. The random number data is a random number that is not related to the random number data (R) described in FIG. 11 and FIG. 12. In step S42, random number data is set to the memory cells in dummy area 8 on which read operations are performed in parallel with the PUF data. In step S43, the random number data set in step S42 is written by write circuit 14 to the memory cells in dummy area 8.

As described above, Fuzzy Extractor is used for error correction of PUF data. In other words, in the memory cell of dummy area 8 corresponding to the helper data in information area 7, parity data for error correction relative to the helper data is stored. In contrast, since it is not necessary to store error correction data for PUF data in the memory cells of dummy area 8 corresponding to PUF data, the correlation between PUF data and side-channel leakage can be reduced by, for example, writing random number data.

Note that, in the present example, the data written to the dummy cells is random number data, but the present disclosure is not limited to such an example. In the PUF data according to Example 2, unique ID data is generated from variations in the same resistance state. Hence, for example, the complexity of the correlation can be increased by simply setting all the memory cells in dummy area 8 to the same resistance state (for example, low resistance state) as PUF.

[Evaluation of Resistance to Side-Channel Attacks on Non-Volatile Memory Device]

Next, evaluation of resistance to side-channel attacks on the non-volatile memory devices according to Example 1 and Example 2 will be described.

Figure 17:
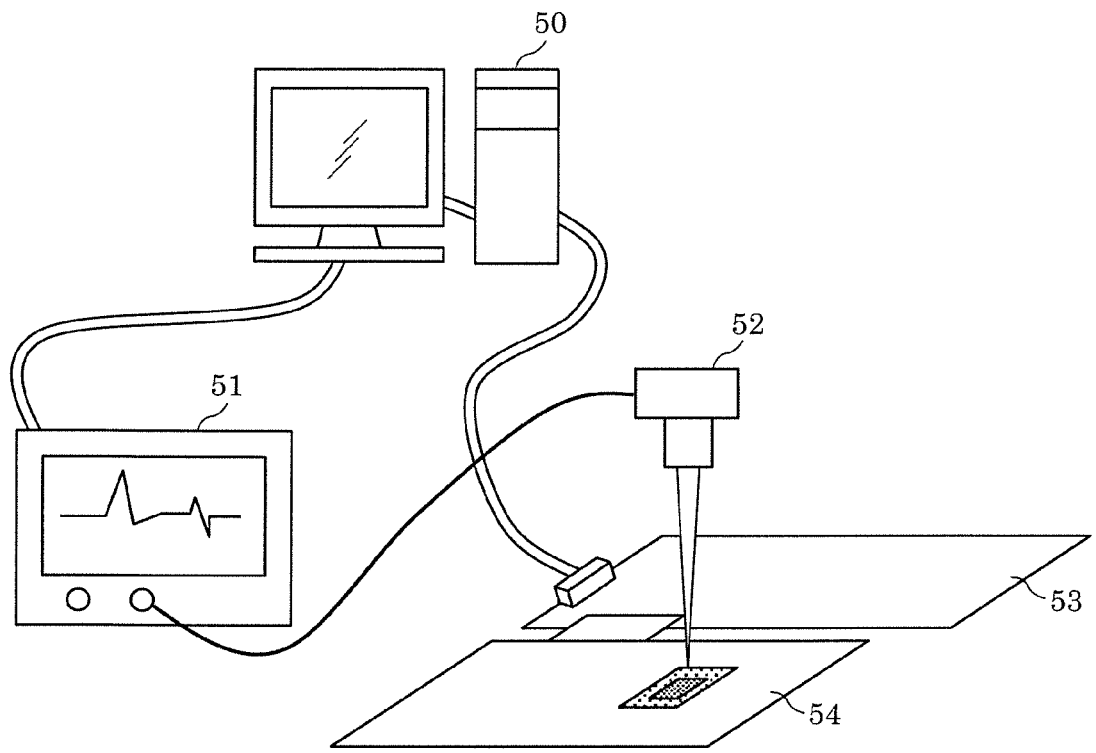
FIG. 17 illustrates an evaluation environment of a side-channel attack.

FIG. 17 illustrates an evaluation environment of a side-channel attack. The evaluation environment includes, for example, personal computer (PC) 50, oscilloscope 51, electromagnetic field (EM) probe 52, chip evaluation board 53, and non-volatile memory device 54. PC 50 is connected to chip evaluation board 53 and oscilloscope 51, and EM probe 52 is connected to oscilloscope 51. When a read operation command is transmitted from PC 50 to chip evaluation board 53, non-volatile memory device 54 starts a read operation. When the read operation is performed, non-volatile memory device 54 consumes power for the read operation, and accordingly, the current flowing through the circuit becomes a magnetic field appearing on the chip surface. The generated magnetic field is detected as side-channel information by EM probe 52, and waveform data is output to oscilloscope 51. The waveform data displayed on oscilloscope 51 is obtained by PC 50 for analysis.

Figure 18:
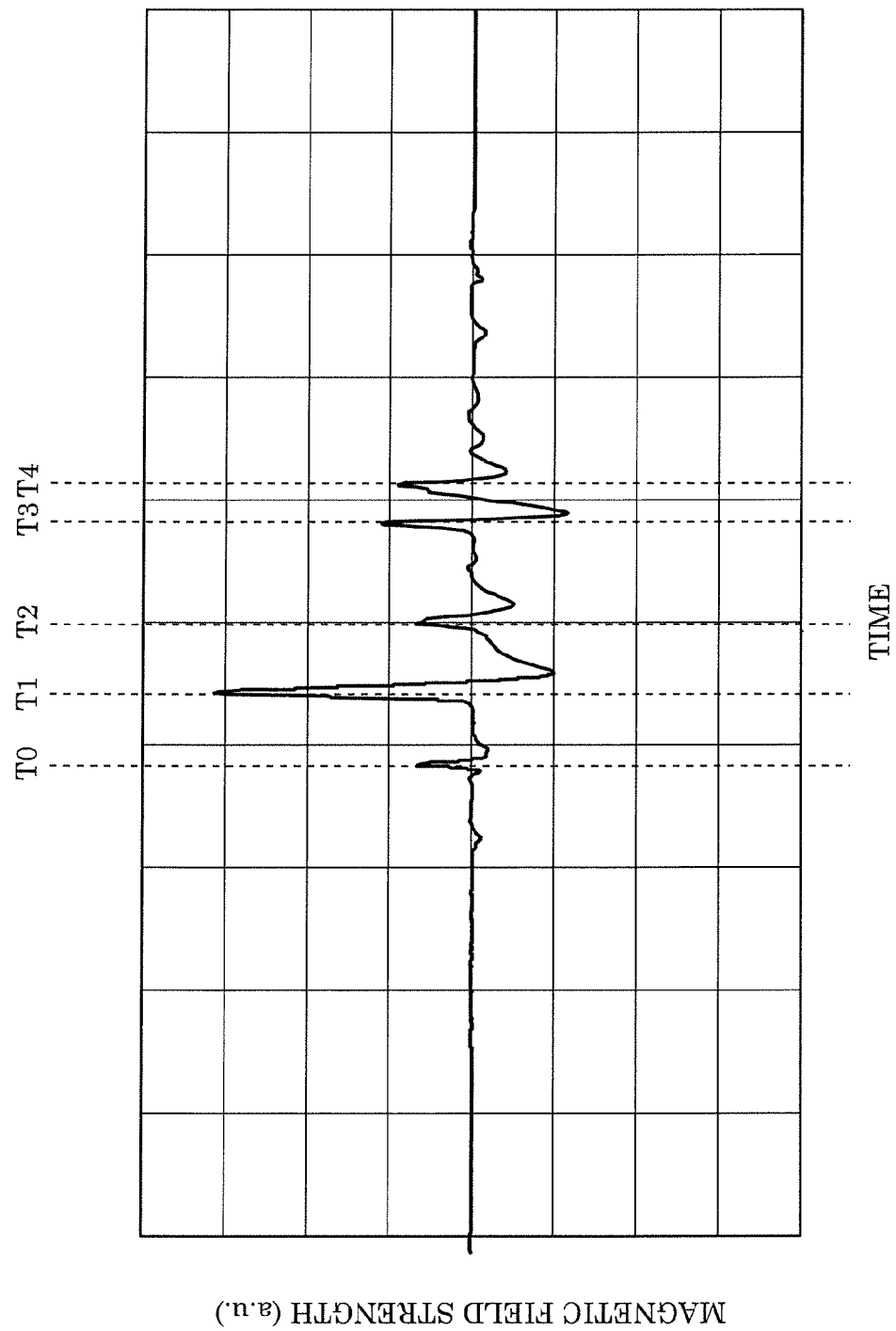
FIG. 18 illustrates side-channel information.

FIG. 18 illustrates side-channel information obtained by EM probe 52 when the read circuit of non-volatile memory device 54 is operated for one cycle in the evaluation environment of FIG. 17. At the timings (T1 to T4) when the respective signals switch corresponding to the timing chart illustrated in FIG. 8, significant changes in power consumption can be seen. This shows the detection of the side-channel leakage. The evaluation results of the resistance to side-channel attacks on non-volatile memory device 10 according to Example 1 and Example 2 described below are the results obtained when the leakage at T3 is subjected to the evaluation.

Figure 19:
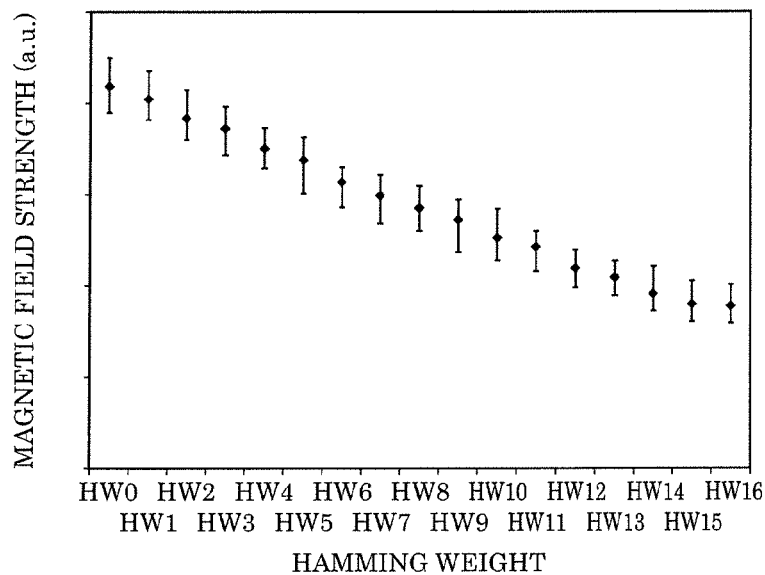
FIG. 19 illustrates a correlation between Hamming weight and magnetic field strength in the memory cell array of the non-volatile memory device according to Example 1.

FIG. 19 illustrates a correlation between Hamming weight and magnetic field strength in the memory cell array of non-volatile memory device 10 according to Example 1. Specifically, a plurality of memory groups each having a data pattern of Hamming weights 0 to 16 are generated for the memory cell array according to Example 1 without dividing the memory cell array into information area 7 and dummy area 8. Next, read operations are performed 100 times on each memory group. In other words, read operations are performed 100 times on each of a plurality of memory groups with the Hamming weight that is 0, read operations are performed 100 times on each of a plurality of memory groups with the Hamming weight that is 1, . . . , and read operations are performed 100 times on each of a plurality of memory groups with the Hamming weight that is 16. FIG. 19 is a plot of the magnetic field strength obtained by averaging the waveforms obtained by EM probe 52 100 times for each of the plurality of memory groups. In FIG. 19, each diamond point indicates the median value of the plotted magnetic field strength for each Hamming weight, and each error bar indicates the line connected between the minimum value and the maximum value of the plotted magnetic field strength for each Hamming weight. This figure also shows that the Hamming weight and the side-channel leakage (here, the magnetic field strength) have a strong correlation. Since the method of plotting the magnetic field strength in the drawings described below is the same as that in FIG. 19, the description thereof will be omitted.

Figure 20:
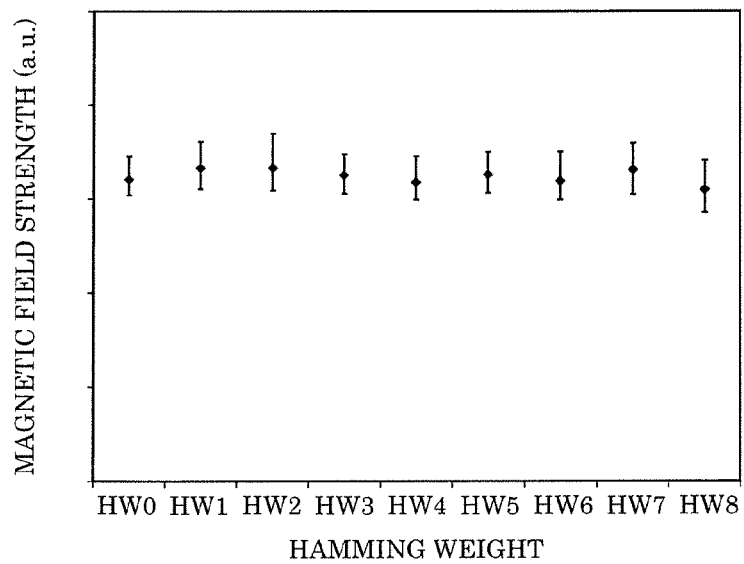
FIG. 20 illustrates the magnetic field strength when the Hamming weight is constant in the memory cell array of the non-volatile memory device according to Example 1.

FIG. 20 illustrates the magnetic field strength when the Hamming weight of each memory group is constant in the memory cell array of non-volatile memory device 10 according to Example 1. Specifically, FIG. 20 shows the result obtained by dividing the memory cell array according to Example 1 into information area 7 and dummy area 8, and adjusting the entire Hamming weight of each memory group to be a constant value of 8 relative to the memory groups in information area 7 with the Hamming weight that varies from 0 to 8. In the measure in which the Hamming weight is constant, the Hamming weight of dummy area 8 is adjusted relative to the Hamming weight of information area 7. Hence, it can be seen that the correlation between the memory cells in information area 7 and the side-channel leakage is reduced. For example, the side-channel leakage of the memory group when the Hamming weight of information area 7 alone is 0 is substantially the same as the side-channel leakage of the memory group when the Hamming weight of information area 7 alone is 8. From this point, it can be understood that the correlation between the side-channel leakage and the information data recorded in the data cells is reduced.

Figure 21:
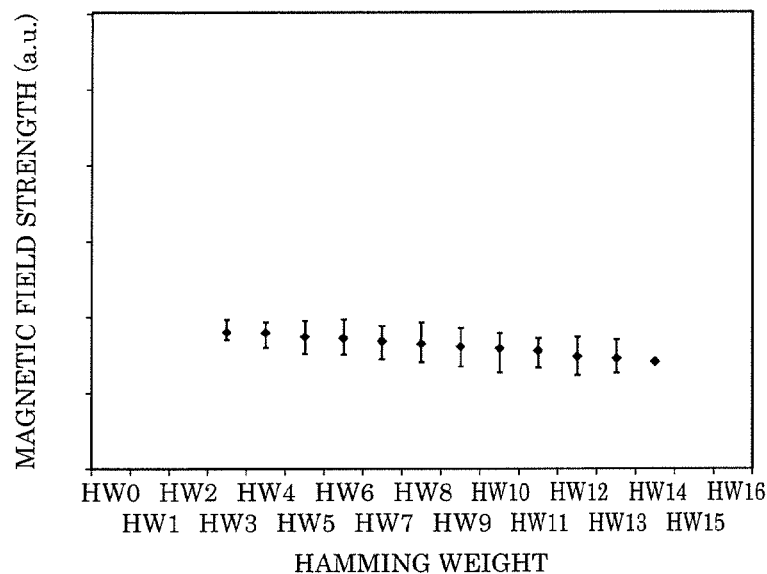
FIG. 21 illustrates a correlation between Hamming weight and magnetic field strength in the memory cell array of the non-volatile memory device according to Example 2.

FIG. 21 illustrates a correlation between Hamming weight and magnetic field strength in the memory cell array of non-volatile memory device 10 according to Example 2. Specifically, FIG. 21 illustrates a relationship between the Hamming weight of the PUF data and the magnetic field strength obtained by EM probe 52, when dummy area 8 associated with information area 7 in which the PUF data is recorded is in the initial state (insulated state) in the memory cell array according to Example 2. The PUF data in Example 2 generates unique ID data from slight variations in resistance in the same resistance state, and thus, all of the PUF data is seemingly in a low resistance state, and a strong correlation as in Example 1 cannot not seen. However, as illustrated in FIG. 21, as the Hamming weight increases, the magnetic field strength decreases, which means that there is a slight correlation. Note that FIG. 21 does not illustrate data when the Hamming weight is 0 to 2, 15, and 16. This is because PUF data is generated from slight variations in resistance in the same resistance state with high randomness, and data 1 or data 0 in FIG. 3 etc. is less likely to be allocated to almost all memory cells in the memory group.

Figure 22:
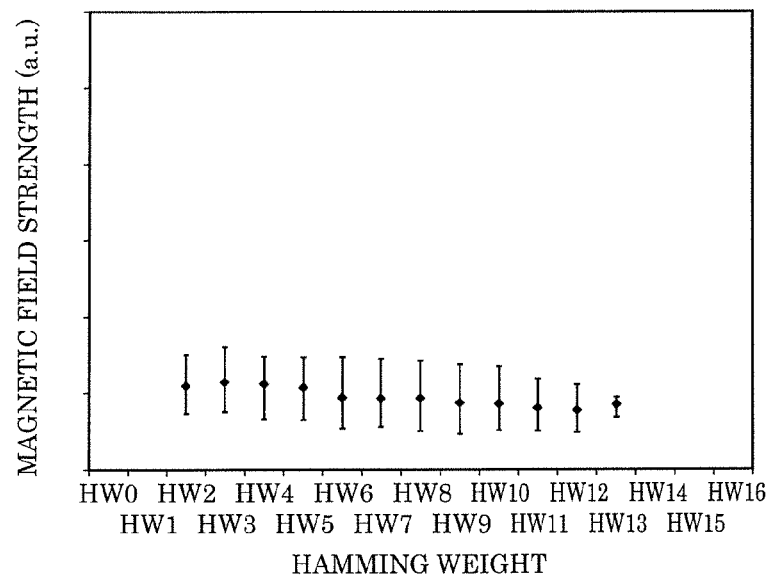
FIG. 22 illustrates the magnetic field strength when the Hamming weight is constant in the memory cell array of the non-volatile memory device according to Example 2.

FIG. 22 illustrates the magnetic field strength in the memory cell array of the non-volatile memory device according to Example 2 when the Hamming weight is constant. Specifically, FIG. 22 illustrates a correlation between the Hamming weight of information area 7 and the side-channel leakage when the random number data is written to dummy area 8 in the memory cell array according to Example 2. It can be understood that each Hamming weight and variations in the corresponding magnetic field strength increase due to influences of the random number data written to dummy area 8. In addition, it can be understood that the range of each error bar is also increased. In other words, this means that writing of the random number data to dummy area 8 increases the complexity of narrowing down the data by the Hamming weight.

As described above, since device-specific PUF data which uses variations in physical characteristics is recorded in a plurality of memory cells, tamper resistance can be further enhanced.

For example, a plurality of memory cells include one or more variable memory cells in a variable state in which the resistance value reversibly changes between a plurality of variable resistance value ranges in response to an application of a plurality of electrical signals which are mutually different. Resistance value variations of variable memory cells in the same resistance state are used as the variations in physical characteristics used in the PUF data. This facilitates generation of PUF data.

Moreover, PUF data is recorded in at least one data cell, and error correction data associated with the PUF data in a one-to-one correspondence is not recorded in a plurality of memory cells included in the memory group. The error correction data associated with the PUF data in a one-to-one correspondence is error correction data that can be recorded in a dummy cell associated with the data cell in which the PUF data is recorded, and is data that can be read is parallel with the PUF data. In Example 2, as illustrated in FIG. 15, random number data is recorded in the dummy cell, and error correction data associated with the PUF data in one-to-one correspondence is not recorded.

Accordingly, if error correction data of PUF data (error correction data associated with PUF data in a one-to-one correspondence) is recorded in a plurality of memory cells included in a memory group, it is possible to analyze the PUF data from the error correction data. However, since the error correction data is not recorded, tamper resistance can be further enhanced. The error correction of PUF data can be performed by helper data generated by Fuzzy Extractor even without using the error correction data. In addition, since dummy data can be recorded in a free area (for example, a dummy cell) which is generated because the error correction data is not recorded, tamper resistance can be enhanced.

Moreover, the dummy data is random number data. According to the above aspect, since the Hamming weight has a value corresponding to the random number data, the side-channel leakage corresponds to the random number data. As a result, the correlation between the side-channel leakage and the information data can be reduced. Note that at least one dummy cell may be a memory cell in a variable state, and dummy data may be a resistance value in the same resistance state. In this case, PUF data can be used as dummy data also in the dummy cell as well as the data cell.

The non-volatile memory device described above makes it possible to protect the secret key more securely. For example, even if narrowing down of the Hamming weight is attempted by a side-channel attack on a non-volatile memory device, since the correlation between the Hamming weight and the side-channel leakage (for example, magnetic field waveform) is small, it is difficult for the attacker to narrow down candidate data for a brute force attack. This significantly increases the amount of calculation, leading to enhanced security.

Other Embodiments

Although non-volatile memory device 10 according to the embodiment has been described above, the present disclosure is not limited to the above embodiment.

For example, in the above embodiment, non-volatile memory device 10 does not have to include write circuit 14, and dummy data may be recorded in advance in dummy cells.

Moreover, for example, the PUF data may be individual identification information generated by a PUF technique (for example, data generated using variations in resistance value in the same resistance state), or may be base data of the individual identification information (for example, data indicating the same resistance state including variations in resistance value).

Moreover, for example, in the above embodiment, resistance value variations of the variable memory cells in the same resistance state described in FIG. 3 are used as the variations in physical characteristics used in the PUF data. However, the present disclosure is not limited to such an example. For example, variations in cumulative pulse time period necessary for the forming stress described in FIG. 4 may be used as the variations in physical characteristics used in the PUF data.

Moreover, for example, in the above embodiment, a plurality of data cells are included in information area 7 and a plurality of dummy cells are included in dummy area 8. However, it is sufficient that at least one data cell is included in information area 7 and at least one dummy cell is included in dummy area 8.

Moreover, the present disclosure can be realized not only as a non-volatile memory device, but also as a writing method including steps (processes) performed by each structural element included in the non-volatile memory device.

Specifically, the writing method is a method of writing to non-volatile memory device 10 which includes: a memory group of a plurality of memory cells in which digital data is recorded according to a magnitude of a resistance value, the memory group including at least one data cell and at least one dummy cell which are associated with each other, the plurality of memory cells being variable resistance memory cells; and read circuit 11 which performs, in parallel, a read operation on each of the plurality of memory cells. In the writing method, dummy data, for reducing the correlation between the side-channel leakage generated when a read operation is performed by read circuit 11 and the information data recorded in at least one data cell, is written to at least one dummy cell (step S13 in FIG. 10 or step S43 in FIG. 16).

For example, those steps may be performed by a computer (computer system). The present disclosure can be realized as a program for causing a computer to execute the steps included in the method described above. Moreover, the present disclosure can be realized as a non-transitory computer-readable recording medium, such as a CD-ROM, in which the program is recorded.

For example, when the present disclosure is realized by a program (software), each step is executed by executing the program using hardware resources, such as a CPU, a memory, and an input and output circuit, included in a computer. In other words, each step is executed by the CPU obtaining data from the memory or the input and output circuit and performing an operation, or outputting the operation result to the memory or the input and output circuit or the like.

In addition, each structural element included in non-volatile memory device 10 according to the above-described embodiment may be realized as a dedicated circuit or a general-purpose circuit.

Moreover, each structural element included in non-volatile memory device 10 according to the above-described embodiment may be realized as a large scale integration (LSI) which is an integrated circuit (IC).

The integrated circuit is not limited to the LSI, and may be realized by a dedicated circuit or a general purpose processor. A field programmable gate array (FPGA) or a reconfigurable processor, in which connection and setting of circuit cells in the LSI can be reconfigured, may be used.

Moreover, when advancement in semiconductor technique or derivatives of other technologies brings forth a circuit integration technique which replaces LSI, it will be appreciated that such a circuit integration technique may be used to integrate the structural elements included in non-volatile memory device 10.

From the above description, many modifications and other embodiments of the present disclosure will be apparent to those skilled in the art. Accordingly, the above description should be taken as exemplary only, and is provided for the purpose of teaching those skilled in the art the best mode of carrying out the present disclosure. The structural and/or functional details may be substantially altered without departing from the spirit of the present disclosure.

INDUSTRIAL APPLICABILITY

The non-volatile memory device according to the present disclosure can be mounted on an IC or system on chip (Soc) that performs authentication by data encryption using digital ID data, and accesses a host computer and a server.

What is claimed is:
1. A non-volatile memory device, comprising:
a memory group of a plurality of memory cells in which digital data is recorded according to a magnitude of a resistance value, the memory group including at least one data cell and at least one dummy cell which are associated with each other, the plurality of memory cells being variable resistance memory cells;

a read circuit which performs, in parallel, a read operation on each of the plurality of memory cells included in the memory group, wherein dummy data is recorded in the at least one dummy cell, the dummy data being for reducing a correlation between a side-channel leakage and information data recorded in the at least one data cell, the side-channel leakage being generated when the read operation is performed by the read circuit.

2. The non-volatile memory device according to claim 1, further comprising:

a write circuit which performs a write operation for writing the dummy data on the at least one dummy cell, based on the information data recorded in the at least one data cell.

3. The non-volatile memory device according to claim 1, wherein physically unclonable function (PUF) data is recorded in the plurality of memory cells, the PUF data being device-specific data in which variations in physical characteristics are used.

4. The non-volatile memory device according to claim 3, wherein the plurality of memory cells include a plurality of variable memory cells each of which is a memory cell in a variable state where a resistance value reversibly changes between a plurality of variable resistance value ranges in response to an application of a plurality of electric signals which are mutually different, and resistance value variations of the plurality of variable memory cells in a same resistance state are used as the variations in physical characteristics used in the PUF data.

5. The non-volatile memory device according to claim 3, wherein the plurality of memory cells include:

a variable memory cell which is a memory cell in a variable state where a resistance value reversibly changes between a plurality of variable resistance value ranges in response to an application of a plurality of electric signals which are mutually different; and a memory cell in an initial state where the memory cell does not change to the variable state unless a forming stress is applied, the initial state being in an initial resistance range in which a resistance value does not overlap any of the plurality of variable resistance value ranges, the forming stress being an electric stress which changes the memory cell to the variable state, wherein variations in a cumulative pulse time period necessary for the forming stress are used as the variations in physical characteristics used in the PUF data.

6. The non-volatile memory device according to claim 3, wherein the PUF data is recorded in the at least one data cell, and error correction data of the PUF data is not recorded in the plurality of memory cells included in the memory group.

7. The non-volatile memory device according to claim 1, wherein the dummy data is data for setting a Hamming weight of the at least one data cell and the at least one dummy cell to a predetermined value.

8. The non-volatile memory device according to claim 1, wherein the dummy data is random number data.

9. The non-volatile memory device according to claim 6, wherein the plurality of memory cells include a variable memory cell which is a memory cell in a variable state where a resistance value reversibly changes between a plurality of variable resistance value ranges in response to an application of a plurality of electric signals which are mutually different, the at least one dummy cell is the variable memory cell, and the dummy data is a resistance value in a same resistance state.

10. A method of writing to a non-volatile memory device including: a memory group of a plurality of memory cells in which digital data is recorded according to a magnitude of a resistance value, the memory group including at least one data cell and at least one dummy cell which are associated with each other, the plurality of memory cells being variable resistance memory cells; and a read circuit which performs, in parallel, a read operation on each of the plurality of memory cells, the method comprising:

writing dummy data to the at least one dummy cell, the dummy data being for reducing a correlation between a side-channel leakage and information data recorded in the at least one data cell, the side-channel leakage being generated when the read operation is performed by the read circuit.

* * * * *